(12) United States Patent
Sugimoto et al.

(10) Patent No.: US 9,632,740 B2
(45) Date of Patent: Apr. 25, 2017

(54) SYSTEM AND METHOD FOR AN INPUT-DRIVEN, SWITCHING-ENABLED, DISPLAY DEVICE FOR AN AUTOMATION CONTROLLER

(71) Applicant: ROCKWELL AUTOMATION ASIA PACIFIC BUSINESS CENTER PTE. LTD., Singapore (SG)

(72) Inventors: Thomas K. Sugimoto, Singapore (SG); Wen Chinn Yew, Singapore (SG); Saurabh Shamkant Prabhudesai, Singapore (SG)

(73) Assignee: Rockwell Automation Asia Pacific Business Center Pte. Ltd., Singapore (SG)

( * ) Notice: Subject to any disclaimer, the term of this patent is extended or adjusted under 35 U.S.C. 154(b) by 497 days.

(21) Appl. No.: 14/159,284

(22) Filed: Jan. 20, 2014

(65) Prior Publication Data

US 2015/0134086 A1    May 14, 2015

(51) Int. Cl.
  *G05B 15/00*  (2006.01)
  *G06F 3/14*   (2006.01)
  *G05B 19/05*  (2006.01)

(52) U.S. Cl.
  CPC .............. *G06F 3/14* (2013.01); *G05B 19/05* (2013.01); *G05B 2219/15115* (2013.01); *G05B 2219/25166* (2013.01)

(58) Field of Classification Search
  None
  See application file for complete search history.

(56) References Cited

U.S. PATENT DOCUMENTS

| 6,424,320 | B1 * | 7/2002 | Callway | G06F 3/1438 345/1.1 |
| 6,489,933 | B1 * | 12/2002 | Ishibashi | G09G 5/363 345/1.1 |
| 7,015,932 | B1 | 3/2006 | Koike et al. | |

(Continued)

FOREIGN PATENT DOCUMENTS

JP    H10240665 A    9/1998

OTHER PUBLICATIONS

SG Search Report Mailed Jul. 27, 2015.
EP Search Report Mailed Aug. 5, 2015.

*Primary Examiner* — Adam Lee
(74) *Attorney, Agent, or Firm* — Fletcher Yoder P.C.

(57) ABSTRACT

Present embodiments include a system and method for providing an input-driven, switching-enabled display device for an automation controller. The display device may include a communication interface port, such as a universal serial bus (USB) port, which is installed in the display device so that it may be easily accessible by a user. The port may increase a user's productivity and efficiency by reducing the time it takes to connect a PC to the automation controller. The display device may also include an interface switch that performs display functionality or port adapter functionality based upon whether a port connection and/or port communication traffic are detected. Thus, embodiments may enable the display device to act as both a text display and a gateway to configure the automation controller with a personal computer (PC) through the use of the easy access port.

21 Claims, 5 Drawing Sheets

(56) References Cited

U.S. PATENT DOCUMENTS

| | | | |
|---|---|---|---|
| 7,317,956 B2* | 1/2008 | Kosaka | G09G 5/363 700/83 |
| 7,716,354 B2 | 5/2010 | Ii et al. | |
| 7,945,937 B2 | 5/2011 | Ogawa | |
| 8,810,586 B2* | 8/2014 | Sudo | G06F 3/14 345/502 |
| 2004/0075638 A1* | 4/2004 | Han | G06F 3/023 345/156 |
| 2004/0239677 A1* | 12/2004 | Mutanen | G09G 5/001 345/545 |
| 2006/0036885 A1* | 2/2006 | Hsieh | G06F 1/1601 713/300 |
| 2006/0244724 A1* | 11/2006 | Erickson | G06F 3/038 345/163 |
| 2007/0067809 A1* | 3/2007 | Kwon | G09G 5/006 725/80 |
| 2007/0103447 A1* | 5/2007 | Varian | G06F 3/0219 345/173 |
| 2007/0147679 A1* | 6/2007 | You | G06F 3/14 382/161 |
| 2009/0165682 A1 | 7/2009 | Cleveland et al. | |
| 2012/0050183 A1* | 3/2012 | Lee | G06F 3/1423 345/173 |
| 2012/0162530 A1* | 6/2012 | Hachiya | H04N 21/4122 348/705 |
| 2012/0284449 A1* | 11/2012 | Tung | G06F 3/023 710/316 |
| 2013/0159593 A1* | 6/2013 | Yeung | G06F 13/4247 710/316 |
| 2013/0184055 A1 | 7/2013 | Schultz et al. | |
| 2013/0232423 A1* | 9/2013 | Hamanaka | G05B 19/409 715/736 |
| 2014/0098003 A1* | 4/2014 | Chien | G06F 13/00 345/1.1 |
| 2014/0281048 A1* | 9/2014 | Alley | G06F 13/385 710/12 |

* cited by examiner

US 9,632,740 B2

SYSTEM AND METHOD FOR AN INPUT-DRIVEN, SWITCHING-ENABLED, DISPLAY DEVICE FOR AN AUTOMATION CONTROLLER

CROSS-REFERENCE TO RELATED APPLICATIONS

This application claims the priority from and benefit of Singapore Patent Application No. 201308397-7, filed Nov. 12, 2013 entitled "System and Method for an Input-Driven, Switching-Enabled, Display Device for an Automation Controller," the full disclosure of which is herein incorporated by reference.

BACKGROUND

The present disclosure relates generally to systems and displays for interfacing with or monitoring automation controllers, and, more particularly, to a system and method for an input-driven, switching-enabled, display device for an automation controller.

Automation controllers, such as programmable logic controllers (PLCs), are often utilized in industrial systems in order to control and make operational decisions for the systems with which the automation controllers are connected. Such automation controllers are typically made up of several components, examples of which may include a processor, memory, input/output assemblies, a power supply, and/or a display. In some industrial settings, the automation controllers are installed within large enclosures, such as electrical cabinets, along with other electronics that make up a stand-alone machine. In order to read output from the automation controller or program the automation controller, the display may be installed in the front door panel of the enclosure. In this configuration, the automation controller may be connected to the display via a cable routed between one of its communication interface ports and a communication interface port on the display. A user may access the display while the enclosure's door is shut but reprogramming an automation controller from the display may not be desirable or feasible due to the limited number of input keys, program length, and/or debugging difficulty. Therefore, in certain situations it is often desirable to connect the automation controller to a personal computer (PC) or the like to upload a precompiled and tested program or update from the PC to the automation controller. This traditionally involves opening the enclosure in which the automation controller is disposed in order to communicatively couple the PC to the automation controller.

BRIEF DESCRIPTION

Certain embodiments commensurate in scope with the originally claimed invention are summarized below. These embodiments are intended only to provide a brief summary of possible forms of the invention. Indeed, the invention may encompass a variety of forms that may be similar to or different from the embodiments set forth below.

In one embodiment, a display device includes a first communication interface port, a second communication interface port, and an interface switch. The first communication interface port is configured to communicatively couple with an automation controller, the second communication interface port is configured to accept input from an external electronic device, and the interface switch is capable of detecting a physical coupling with the second communication interface port or communication traffic from the second communication interface port and switching the display device between at least two modes including a first mode that performs display functionality and a second mode that performs second communication interface port adapter functionality.

In another embodiment, a display device is communicatively coupled to an automation controller via a serial interface on each of the display device and the automation controller. The display device includes a port located on a front panel of the display device, and an interface switch. The interface switch is capable of detecting input and enabling the display device to perform display functionality or to perform adapter functionality, based upon whether a connection at the port is detected and whether communication traffic from the port is detected.

In yet another embodiment, a method includes receiving input at an interface switch within a display device, where the interface switch is electrically coupled to a serial interface port and a programming port and the display device is connected to an automation controller. The method also includes detecting, via the interface switch, a connection and communication traffic from the programming port based on the input. The method also includes performing, via the display device, adapter functionality if both the connection and the communication traffic are detected at the interface switch, and performing, via the display device, display functionality if neither the connection nor the communication traffic are detected at the interface switch, or if only one of the connection or the communication traffic is detected at the interface switch.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
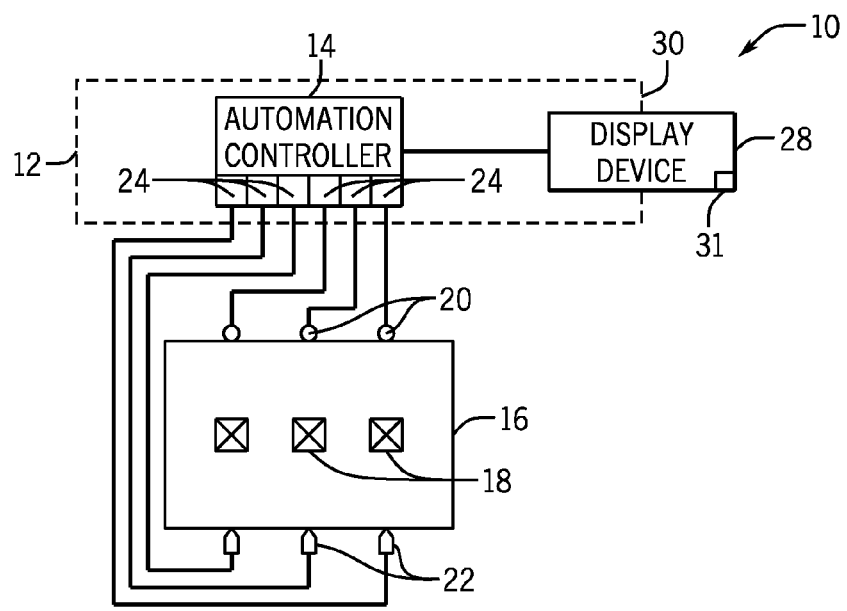
FIG. 1 illustrates an embodiment of an industrial automation and control system in accordance with aspects of the present techniques.

It is now recognized that switching between utilizing a display and a personal computer (PC) (e.g., a laptop) to operate an automation controller can be inefficient, especially when the automation controller is disposed within a protective enclosure (e.g., an electrical cabinet). For example, if the automation controller has a single (only one) communication interface port (e.g., a port capable of enabling programming), a user often has to open the large enclosure door, unplug the display's cable from the controller's communication interface port and swap in the PC's cable in order to enable PC programming of the automation controller. Alternatively, if the automation controller has two communication interface ports, the display may remain connected to one of the controller's communication interface ports and the PC may be connected via a cable to the second communication interface port. However, in both scenarios, the user must still open the large cabinet door in order to connect the PC, which is inconvenient and reduces productivity.

As discussed in detail below, embodiments of the present techniques function to provide an input-driven, switching-enabled, display device for an automation controller, such as a programmable logic controller (PLC). The display device may be located locally or remotely from the system in which the automation controller resides. For example, the automation controller may be housed in an enclosure and the display device may be installed in the enclosure's door so that the display device is accessible when the enclosure's door is shut. As another example, the display device may be a stand-alone device that is connected to the automation controller via a cable. The display device may also be a "dumb" device (at least with respect to certain functional aspects) that lacks electronic processing power of its own for performing at least certain tasks and relies on processing from the automation controller to perform such tasks. The display device may include one or more communication interface ports for connection to a personal computer (PC) or other electronic device. It should be noted that the communication interface port may be any protocol capable of communicating with electronic devices but, for purposes of the present discussion, universal serial bus (USB) port will be used as an embodiment of the communication interface port.

The display device may switch between at least two primary modes of operation based on whether a physical connection is detected at the USB port and whether communication traffic is detected from the USB port. In some embodiments, only a physical connection at the USB port or communication at the USB port will suffice to activate switching. Such switching may be accomplished by the display device through the inclusion of an automatic interface switch that enables the device to switch functionalities between a display mode and a USB communication mode. When USB port connection or communication traffic is not detected, the display device may be configured to operate in a first mode that performs default display (e.g., text) functionality. This functionality may be described as "display functionality" and includes providing an interface to the automation controller via a display of data on a screen of the display device. However, when both USB port connection and communication traffic are detected, the interface switch may switch to a second mode of operation by performing what may be referred to as the "USB adapter functionality." In this second mode of operation, the display device may route data from the PC to the automation controller, thus enabling programming, downloading, uploading, and so forth from the PC. In some embodiments, the display device's screen may be utilized in conjunction with the PC while the PC is connected to the USB port. Further, when a cable is disconnected from the USB port on the display device, the automatic interface switch may disable the USB communication mode and redirect data from the automation controller to the first mode of display functionality on the display device.

As may be appreciated, a USB port embedded in the display device and accessible from the outside of the enclosure will enable a user to connect a PC or other electronic device to the automation controller easily. This may be accomplished without having to open the enclosure's door in order to swap cables from the display to the PC or to plug a cable directly into the automation controller. This easy access USB port coupled with the automatic switching functionality provided by certain embodiments may increase the productivity and efficiency of users. Additionally, the benefits described from the techniques discussed in detail below come at a low cost as the inclusion of a USB port in the front of the display device and the switching capabilities are not altogether expensive to implement. Furthermore, the use of switching may avoid redundancies that may add costs, such as ports for both display functionality and USB adapter functionality.

With the foregoing in mind, an embodiment of an industrial automation and control system 10 in accordance with aspects of the present techniques is illustrated in FIG. 1. The system 10 includes an enclosure 12, such as an electrical cabinet, in which electrical components such as monitoring and/or control components are housed. Example components in the unit may include relays, motor starters, and PLCs, among others.

The enclosure 12 may be suitable, for example, for assembly of a motor control center or use with industrial, commercial, marine, or other electrical systems. The enclosure 12 may be made of any suitable material, such as heavy gage sheet metal, reinforced plastics, and so forth, in order to protect the housed monitoring and/or control components from various risks, such as damage from fire, water, dust, tampering, and the like. Generally, the enclosure 12 may be any size suitable to satisfactorily house its contents. Thus, the enclosures 12 for industrial systems may be large. Such enclosures 12 may be temperature controlled in order to prevent the monitoring and/or control components from overheating. In certain embodiments, the enclosure 12 includes individual compartments or other structures that support the electrical components.

In the illustrated embodiment, the system 10 includes an automation controller 14 adapted to interface with components of a machine system/process 16. It should be noted that such an interface may be facilitated by the use of certain network strategies. Indeed, an industry standard network may be employed to enable data transfer. Such networks permit the exchange of data in accordance with a predefined protocol, and may provide power for operation of networked elements.

The process/system 16 may take many forms and include devices for accomplishing many different and varied purposes. For example, the process/system 16 may comprise a compressor station, an oil refinery, a batch operation for making food items, a mechanized assembly line, and so forth. Accordingly, the process/system 16 may comprise a variety of operational components generally represented by reference numeral 18, such as electric motors, valves, actuators, temperature elements, pressure sensors, or a myriad of manufacturing, processing, material handling and other applications.

Further, the process/system 16 may comprise control and monitoring equipment for regulating process variables through automation and/or observation. For example, the illustrated process/system 16 comprises sensors 20 and actuators 22. The sensors 20 may comprise any number of devices adapted to provide information regarding process conditions. The actuators 22 may include any number of devices adapted to perform a mechanical action in response to an input signal.

As illustrated, these sensors 20 and actuators 22 are in communication with the automation controller 14. In one embodiment, the sensors 20 and actuators 22 may communicate with the automation controller 14 via one or more I/O modules 24 coupled to the automation controller 14. The I/O modules 24 may transfer input and output signals between the automation controller 14 and the controlled process/system 16.

The I/O modules 24 may be integrated with the automation controller 14, or may be added or removed via expansion slots, bays or other suitable mechanism. For example, to add functionality to the automation controller 14, additional I/O modules 24 may be added, such as if new sensors 20 or actuators 22 are added to control the process/system 16. These I/O modules serve as an electrical interface to the automation controller 14 and may be located proximate or remote from the controller including remote network interfaces to associated systems.

In some embodiments, the I/O modules 24 may be located in close proximity to a portion of the control equipment, and away from the automation controller 14. In such embodiments, data is communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet. or other network protocols (Foundation Fieldbus (H1 and Fast Ethernet) Modbus TCP, Profibus) and also communicate to higher level computing systems In the illustrated embodiment, the system 10 also includes a display device 28 such as an LCD or other display configured to display output parameters such as operating parameters of the process/system 10 provided via the automation controller 14. These parameters may include temperature and pressures sensed by the sensors 20, position information of the actuators 22 and so forth. The display device may include input keys that enable a user to reprogram the automation controller 14. The display device 28 may be connected to the automation controller 14 via a cable that is plugged into a communication interface port embedded in the automation controller 14 and the display device 28, respectively. The automation controller only requires a single communication interface to enable embodiments of the present techniques. For purposes of the present discussion, the communication interface port used to connect the automation controller 14 and the display device 28 may utilize any protocol capable of enabling communication between electronic devices, but serial interface ports will be used as an example. As may be appreciated, serial interfaces are physical communication interfaces through which data may transfer in or out. In certain embodiments, the display device 28 may be installed in the enclosure's door 30 and include a port 31 (e.g., USB port) that is embedded in the display device 28.

The port 31 may be installed in the display device's front panel so that it is accessible by a user when the enclosure's door 30 is closed. In some embodiments, the port 31 may be located anywhere on the display device 28 for easy access if the display device 27 is not installed in the enclosure's door 30. The port 31 may enable programming and, thus, may be referred to as a programming port. Further, the port 31 may specifically include a USB port. It should be noted that "USB" may be an industry standard that defines the cables, connectors, and communication protocols used in a bus for connection, communication, and power supply between computers and electronic devices. By utilizing the port 31, a user may connect a cable between a PC and the display device 28 in order to reprogram the automation controller 14 or upload an update to it without having to open the enclosure's door 30. As will be described in more detail below, this may be achieved in certain embodiments that enable automatic switching between modes including display functionality and/or USB adapter functionality based upon USB port connection and communication traffic detection from the port.

Figure 2:
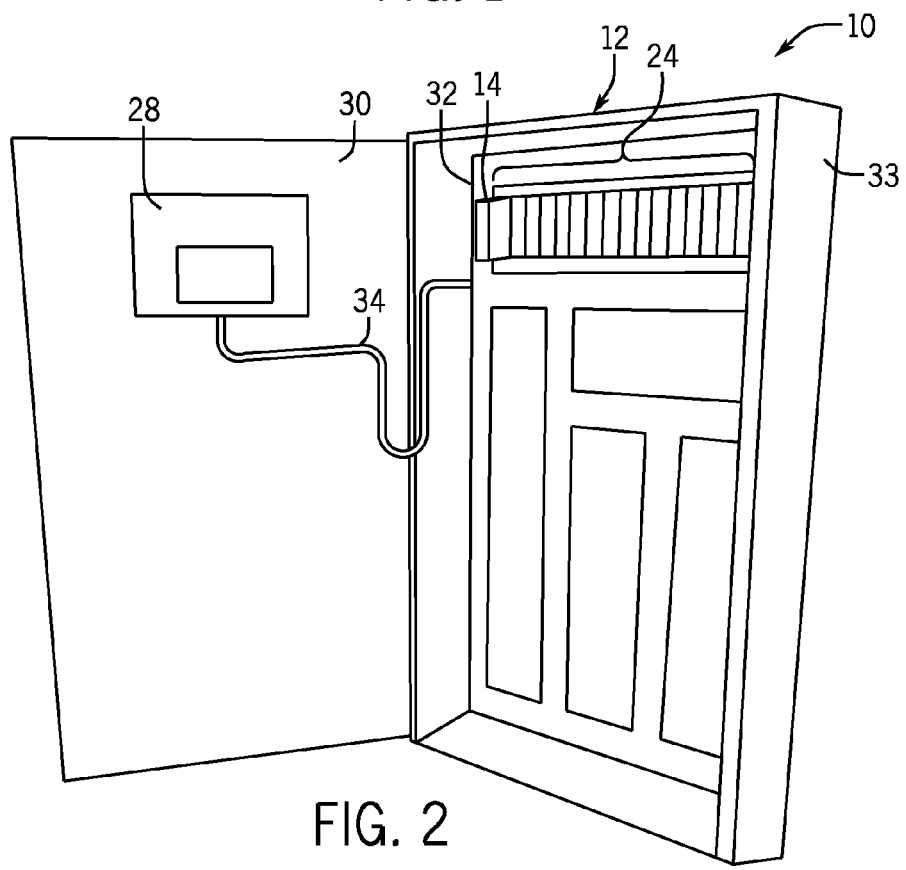
FIG. 2 illustrates an embodiment of an industrial automation and control system including a display device installed in an enclosure's door in accordance with aspects of the present techniques.

Another embodiment of the system 10 that includes a display device 28 installed in an enclosure's door 30 that is open is illustrated in FIG. 2. As previously mentioned, the enclosure 12, such as an electrical cabinet, may be utilized to house the automation controller 14, I/O modules 24, power supply 32, and display device 28. The enclosure 12 may include the door 30 and a compartment 33 that houses the electrical components. As can be seen, the display device 28 may be installed in the cabinet door 30 and connected to the automation controller 14 via a cable 34. It should be noted, however, that the display device 28 may be installed locally anywhere inside of the enclosure 12. Additionally, the display device 28 may be operable remotely as a separate device from the system 10 when connected via an extended cable or wirelessly to the automation controller 14. As such, a display device 28 installed in the enclosure's door 30 or remotely connected to the automation controller 14, may allow a user to reprogram the controller or read output from the automation controller 14 from the outside of the enclosure 12 without having to open the enclosure's door 30.

Figure 3:
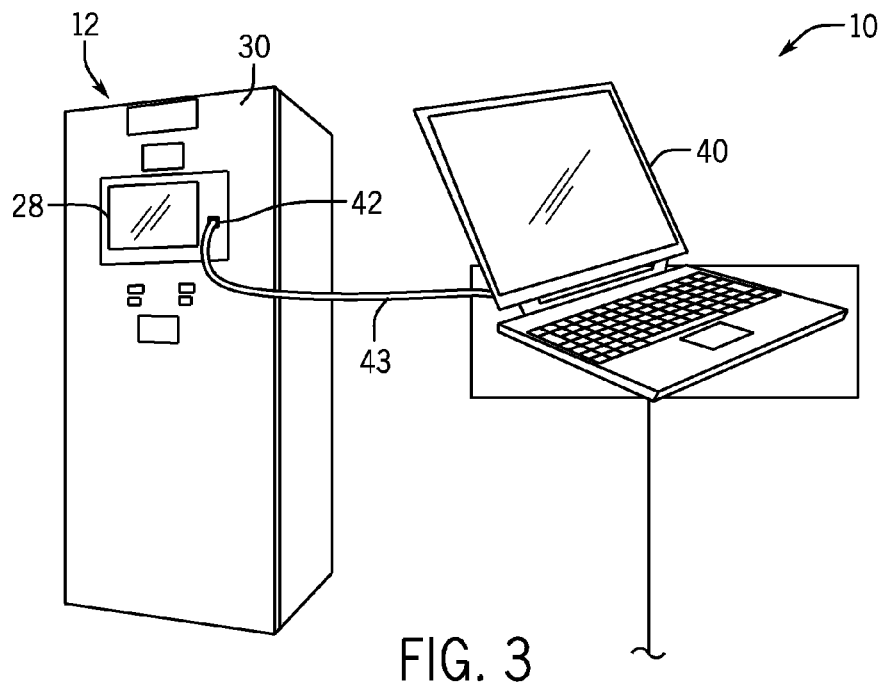
FIG. 3 illustrates an embodiment of an industrial automation and control system including a display device installed in an enclosure's door with a personal computer (PC) connected to a universal serial bus (USB) port installed in the display device in accordance with aspects of the present techniques.

Indeed, FIG. 3 provides an illustrated embodiment of the system 10 where the enclosure's door 30 is closed. As may be seen, the display device 28 is accessible from the exterior of the enclosure 12, which may enable a user to read output from the automation controller 14 or reprogram the automation controller 14, among other things. However, oftentimes the program that needs to be implemented or updated requires extensive coding and it is not desirable or feasible to utilize the display device 28. This may be because the display device 28 contains a limited number of input keys, a relatively small display screen to code on, limited debugging capabilities, and so forth. In these scenarios, a user will write the program on a PC and test it on the PC in order to work out any bugs before deploying it on the automation controller 14. In this way, the user saves time coding by utilizing a full sized keyboard and/or a PC running an Independent Development Environment (IDE) that provides enhanced debugging capabilities. Once the program is ready to deploy, the user may need to connect the PC to the automation controller in order to install the program.

As previously mentioned, it is recognized that this step typically required the user to open the enclosure's door 30 in order to connect the PC in traditional systems, thereby introducing inefficiencies. For instance, if the automation controller included a single communication port, the user would physically unplug the cable attached to the automation controller from the display and insert it into the PC's communication interface port. In some cases, if the automation controller included two communication interface ports, the user may leave the display connected to one of the ports and insert a cable connected to the PC into the other port. However, as may be appreciated, either method of connecting a PC is inefficient with respect to present embodiments, as the user had to open the door in order to connect the PC. Thus, the present techniques allow the user to communicatively connect a PC 40 with the controller 14 while the enclosure's door 30 remains closed. As may be seen in FIG. 3, the PC 40 may be connected to a USB port 42 that is embedded in the display device 28 via a cable 43 without having to open the door 30.

Figure 4:
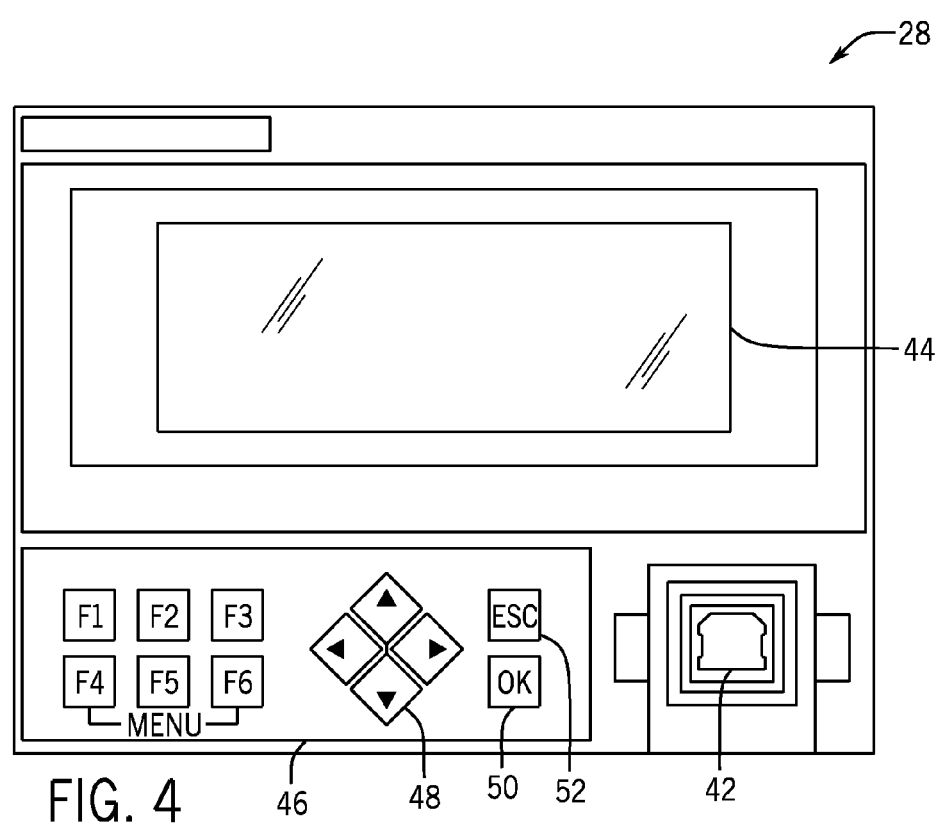
FIG. 4 illustrates an embodiment of a display device in accordance with aspects of the present techniques.

A close up view of an embodiment of the display device 28 that is in accordance with the present techniques is shown in FIG. 4. The display device's front panel may include the USB port 42, a display screen 44, menu buttons 46, directional buttons 48, an enter (e.g., OK) button 50, and an escape button 52, among other features. As may be seen, the USB port 42 is easily accessible to a user that wishes to plug in a PC or any electronic device configured to interface with USB. Combining the USB port 42 with the display screen 44 in the single display device 28 that is capable of being communicatively coupled to the automation controller 14 provides several benefits. First, for example, only one communication port is required on the automation controller 14 in order to enable the multi-functioning display device 28. Further, the user can easily plug in a cable to the USB port 42 in order to communicate with the automation controller 14 via the PC 40 without having to open the enclosure 12 or swap cables, thus increasing efficiency. More advantages may be apparent to one of ordinary skill in the art in light of the below discussion regarding components and methods utilized with the present techniques.

Figure 5:
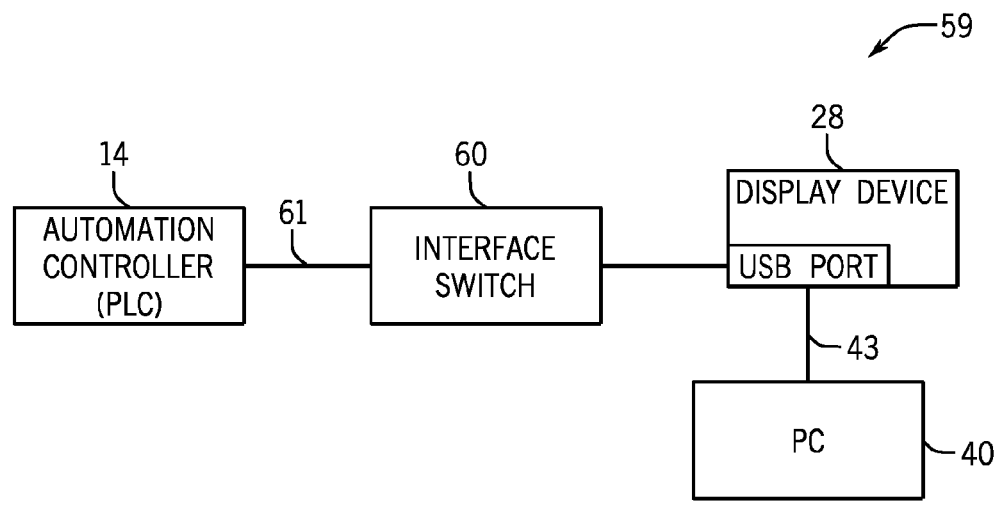
FIG. 5 is a component diagram of a display device and an interface switch connected to a personal computer (PC) and an automation controller in accordance with aspects of the present techniques.
Figure 6:
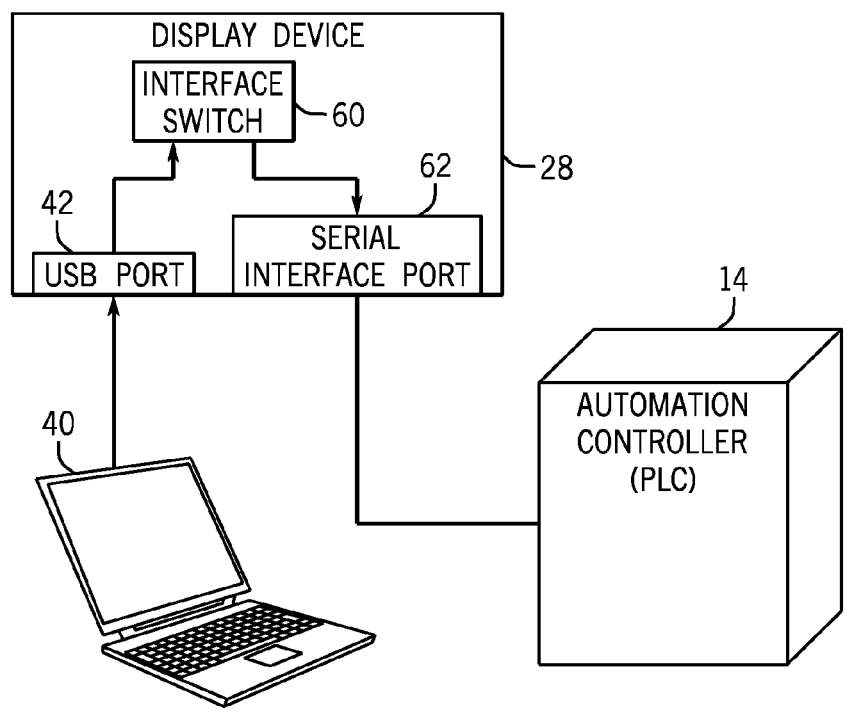
FIG. 6 is a component diagram of a display device connected to a PC and automation controller in accordance with aspects of the present techniques.

A schematic representation of components utilized by an embodiment of a system 59 in accordance with the present disclosure is shown in FIG. 5. As previously described, the PC 40 may be connected to the display device 28 with the cable 43 via the USB port 42. In alternate embodiments, a wireless adapter may be plugged into the USB port 42 and the PC 40 or other electronic device may connect to the display device 28 over a wireless network. This may provide the added benefit of a user being able to read output from the automation controller 14 or configure the automation controller 14 wirelessly. In either embodiment, the display device 28 may include an interface switch 60. In certain embodiments, as shown in FIG. 6, the interface switch 60 may be incorporated into the display device 28. In other embodiments, the interface switch 60 may be located externally from the display device 28 (e.g., within the automation controller 14). The operations of the interface switch 60 are discussed in detail below. Returning to FIG. 5, the interface switch 60 may be communicatively connected to the automation controller 14 via a cable 61 attached to serial interface ports on both the automation controller 14 and the display device 28. In this manner, the interface switch 60 may allow a user to access the automation controller 14 from the PC 40 or other electronic device by switching between default display functionality (e.g., when no USB port connection or no communication traffic from the port is detected) and USB adapter functionality (e.g., when a USB port connection and communication traffic from the port are detected).

As may be seen in FIG. 6, the PC 40 may be connected to the display device 28 via the cable 43 attached to the USB port 42 embedded in a front panel of the display device 28. The USB port 42 may be further connected to the interface switch 60 that is included in the display device 28. As previously described, the interface switch 60 may allow the attached PC 40 to communicate with the automation controller 14 when the interface switch 60 detects a physical coupling with the USB port 42 and communication traffic from the USB port 42. In some embodiments, the interface switch 60 accomplishes this by monitoring a sensor that detects connection and monitoring data traffic though the USB port 42 and then facilitating communication between the PC 40 and the automation controller 14 by forming a communication path allowing data to flow from the PC 40 through the USB port 42 and out a serial interface port 62 to the automation controller 14. A more detailed view of the internal components of an embodiment of the display device 28 is described below with reference to FIG. 7.

Figure 7:
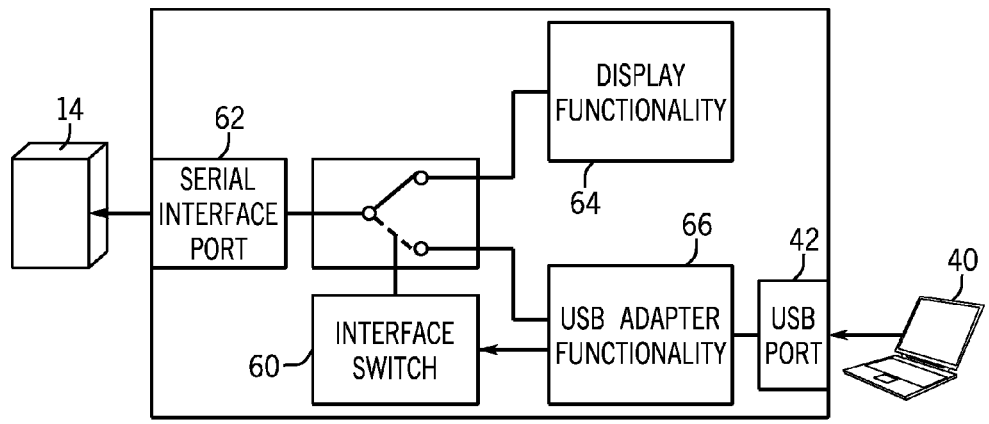
FIG. 7 is an internal component diagram of a display device utilizing an interface switch to perform different functionalities in accordance with aspects of the present techniques.

In FIG. 7, two principle modes of operation are displayed. The first mode performs display (e.g., text) functionality by activating display functionality circuitry 64, and the second mode performs USB adapter functionality by activating USB adapter functionality circuitry 66. In certain embodiments, the default mode is set to activate the display functionality circuitry 64 when no USB port 42 connection is detected or no communication traffic is detected from the USB port 42. When an electronic device, such as the PC 40, is connected to the display device 28 via the USB port 42, the interface switch 60 may utilize detection logic to detect the connection. The detection logic may be provided by firmware embedded on a chip installed in the display device 28 or the like. If a USB connection is detected at the USB port 42, the interface switch 60 may also detect whether data communication traffic is detected from the USB port 42. If the interface switch 60 detects both a USB connection and data communication traffic from the USB port 42, then the interface switch 60 may switch modes to activate the USB adapter functionality circuitry 66. After the switch is complete, the PC 40 may communicate with the automation controller 14 through the display device 28 by sending data through the USB port 42 and out the serial interface port 62.

Figure 8:
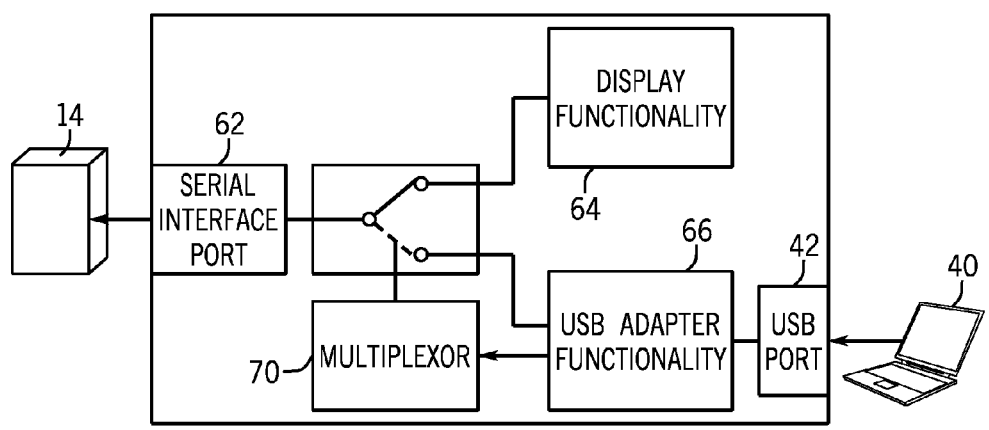
FIG. 8 is an internal component diagram of a display device utilizing a multiplexor to perform concurrent functionalities in accordance with aspects of the present techniques.

Once a user is finished accessing the automation controller 14 from the PC 40, the PC 40 may be disconnected from the display device's 28 USB port 42. When this happens, the interface switch 60 may sense the disconnection (e.g., physical cable removal or no communication traffic detected) and switch back to the mode that performs the display functionality 64, thereby enabling configuration and output viewing from the display device 28. It should be noted that in this embodiment, only one mode may be accessible at a time due to the interface switch 60. However, as displayed in FIG. 8, in some embodiments, a multiplexor 70 may be utilized instead of an interface switch. The multiplexor 70 may allow both functionalities (64 and 66) to be performable even when the PC 40 is connected to the display device 28 via the USB port 42. For example, the display device's screen may still display output but may be placed in a read-only mode when the PC 40 is connected in order to avoid deadlocks or read-write conflicts between the display functionality circuitry 64 and the USB adapter functionality circuitry 66. In this way, the user can still view output on the display device 28 while essentially simultaneously accessing the automation controller 14 through the serial interface port 62 via the PC 40.

Figure 9:
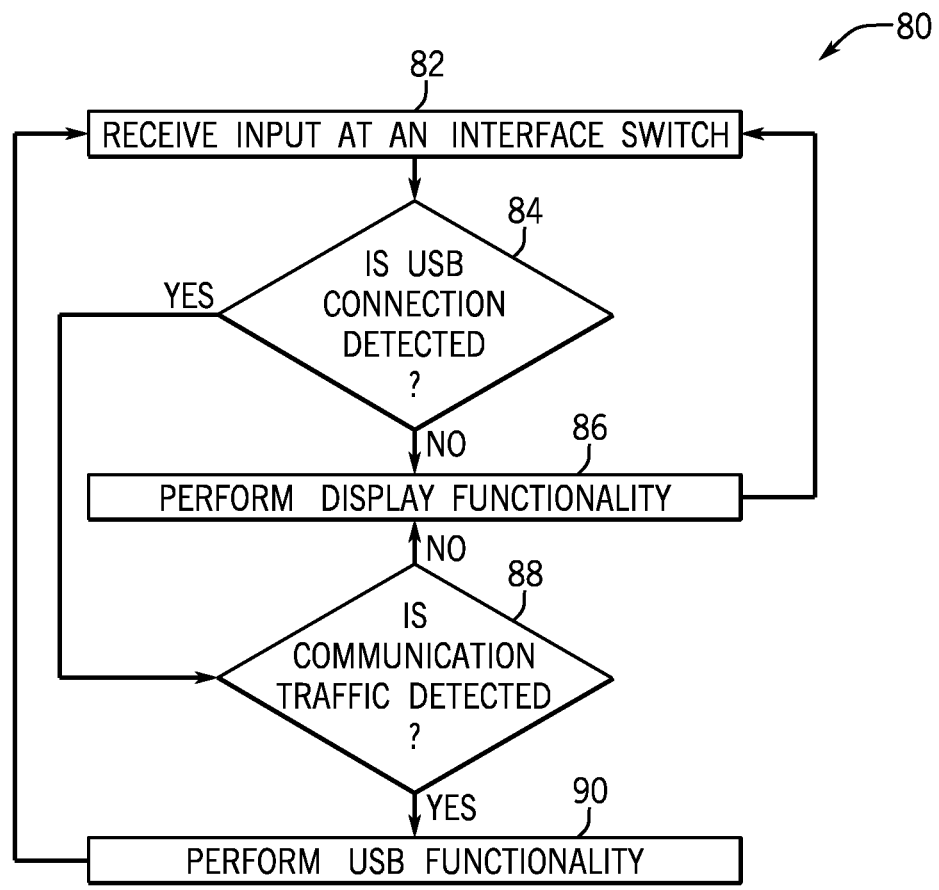
FIG. 9 is a flow diagram of a method of operation for a display device in accordance with aspects of the present techniques.

Further, some embodiments may include a method 80 of operation for the display device as shown by the flow diagram in FIG. 9. The method 80 includes receiving input at an interface switch at block 82. As previously discussed, the interface switch may be installed in the display device. The input may originate from the display device itself (e.g., user pressing input keys on the display device) or from an electronic device, such as a PC, connected to the display device via the USB port. Thus, the display device then determines whether there is a USB connection detected in decision block 84. If there is not a USB connection detected, the method may perform display (e.g., text) functionality as shown in block 86. This mode of operation is the default mode for the display device, as electronics may typically only be connected on an as needed basis (e.g., for reprogramming, downloading, uploading, etc.). However, if the display device was previously performing USB adapter functionality, this step may involve switching from the USB adapter functionality to the display functionality using the interface switch. In either case, the method 80 may return to block 82 to wait to receive input at the interface switch after performing block 86.

However, if a USB connection is detected, the method 80 may further determine whether communication traffic is detected, as shown in decision block 88. If there is communication traffic detected, then the method may perform USB adapter functionality according to block 90. It should be noted that communication traffic may be defined as requests and responses or data flowing in and out of the USB port between the display device and the attached electronic. If the display device was previously performing display functionality before both a USB connection and communication traffic was detected then this step may require switching to perform USB adapter functionality by the interface switch. If there is not communication traffic detected, then the method may proceed to block 86 and perform display functionality. Therefore, in order for the interface switch to switch to the mode that performs USB adapter functionality, not only does there have to be a USB connection detected, but there must also be communication between the display device and an external electronic, such as a PC. In some embodiments, either a physical connection with the USB port or traffic detected passing through the USB port may trigger the USB functionality of block 90.

After the method 80 performs USB adapter functionality it may return to block 82 to wait to receive input at the interface switch. As may be seen, in this manner, the method 80 may handle scenarios where a USB cable is physically disconnected from the USB port or where traffic has ceased. In either case, the method 80 would determine that the USB connection is no longer detected (block 84) or communication traffic is no longer detected (block 88), respectively, and switch modes to performing display functionality in block 86. Thereafter, the method 80 may return to block 82 to wait to receive further input, and the cycle may continue, switching back and forth from display functionality to USB adapter functionality based on input received at the interface switch.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a display device comprising a first communication interface port, a second communication interface port, and an interface switch, wherein:
the first communication interface port is configured to communicatively couple with an automation controller that is separate from the display device;
the second communication interface port is configured to accept input from an external electronic device; and
the interface switch is configured to detect a physical coupling with the second communication interface port or communication traffic from the second communication interface port and switch the display device between at least two modes including a first mode that performs display functionality and a second mode that performs second communication interface port adapter functionality, wherein the display device is installed in a door of an enclosure housing the automation controller such that a display screen of the display device and the second communication interface port are exposed to the exterior of the enclosure when the door is closed, and the first communication interface port is exposed to an interior of the enclosure when the door is closed.

2. The system of claim 1, wherein the interface switch is configured to switch the device from the first mode to the second mode when the physical coupling with the second communication port is detected and the communication traffic from the second communication interface port is detected.

3. The system of claim 1, comprising the automation controller comprising a single controller communication interface port and the first communication interface port communicatively coupled with the single controller communication interface port.

4. The system of claim 3, wherein the first communication interface port and the single controller communication interface port comprise serial interface ports.

5. The system of claim 1, wherein the second communication interface port adapter functionality enables the external electronic device to access and configure the automation controller.

6. The system of claim 1, wherein the second communication port comprises a universal serial bus (USB) port.

7. The system of claim 1, wherein the external electronic device is a personal computer (PC).

8. The system of claim 1, wherein the automation controller comprises a programmable logic controller (PLC).

9. A system, comprising:
a display device communicatively coupled to an automation controller that is separate from the display device via a serial interface on each of the display device and the automation controller, wherein the display device comprises:
a port located on a front panel of the display device; and
an interface switch, wherein the interface switch is configured to detect input and enable the display device to perform display functionality or to perform adapter functionality, based upon whether a connection at the port is detected and whether communication traffic from the port is detected, wherein the display device is installed in a door of an enclosure housing the automation controller such that a display screen of the display device and the second communication interface port are exposed to the exterior of the enclosure when the door is closed, and the first communication interface port is exposed to an interior of the enclosure when the door is closed.

10. The system of claim 9, wherein the interface switch comprises detection logic comprising firmware that detects the connection and the communication traffic.

11. The system of claim 9, wherein the interface switch performs the adapter functionality if both the connection at the port is detected and communication traffic from the port is detected.

12. The system of claim 9, wherein the automation controller comprises a single serial interface, which is utilized to connect to the display device.

13. The system of claim 9, wherein the interface switch performs the display functionality when neither the connection nor the communication traffic are detected, or if only one of the connection or the communication traffic is detected.

14. The system of claim 9, wherein the adapter functionality enables an external device connected to the port to access and configure the automation controller.

15. A method, comprising:
receiving input at an interface switch within a display device, wherein the interface switch is electrically coupled to a serial interface port and a programming port and the display device is connected to an automation controller that is separate from the display device;
detecting, via the interface switch, a connection and communication traffic from the programming port based on the input; performing, via the display device, adapter functionality if both the connection and the communication traffic are detected at the interface switch; and
performing, via the display device, display functionality if neither the connection nor the communication traffic are detected at the interface switch, or if only one of the connection or the communication traffic is detected at the interface switch, wherein the display device is installed in a door of an enclosure housing the automation controller such that a display screen of the display device and the second communication interface port are exposed to the exterior of the enclosure when the door is closed, and the first communication interface port is exposed to an interior of the enclosure when the door is closed.

16. The method of claim 15, wherein the display device and the automation controller are connected via the serial interface port on the display device and a single communication port on the automation controller.

17. The method of claim 16, wherein the single communication port is a serial interface type port.

18. The method of claim 15, wherein the programming port is located on a front panel of the display device.

19. The method of claim 15, wherein the interface switch is configured so that the display device performs display functionality by default.

20. The method of claim 15, wherein performing adapter functionality comprises forming a communicative link between adapter functionality circuitry and the interface switch and cutting off a separate communicative link between display functionality circuitry and the interface switch.

21. The method of claim 15, wherein performing display functionality comprises forming a communicative link between display functionality circuitry and the interface switch and cutting off a separate communicative link between adapter functionality circuitry and the interface switch.

* * * * *